United States Patent

[11] 3,533,505

[72] Inventor George Larsen Nelson
Westwood, Massachusetts
[21] Appl. No. 637,773
[22] Filed May 11, 1967
[45] Patented Oct. 13, 1970
[73] Assignee Bird Machine Company
South Walpole, Massachusetts
a corporation of Massachusetts

[54] SCREENING APPARATUS
8 Claims, 7 Drawing Figs.

[52] U.S. Cl. ................................................. 209/273,
209/306, 209/379, 210/415
[51] Int. Cl. ................................................. B07b 1/20,
B07b 1/52, D21d 5/02
[50] Field of Search ........................................... 209/270,
273, 300, 303, 304—306, 379, 250; 210/304, 415

[56] References Cited
UNITED STATES PATENTS

| | | | |
|---|---|---|---|
| 1,990,288 | 2/1935 | Knight | 209/273 |
| 2,364,171 | 12/1944 | Strege | 209/273 |
| 3,174,622 | 3/1965 | LaMort | 209/273 |
| 3,255,883 | 6/1966 | Nelson et al. | 209/273X |
| 2,682,812 | 7/1964 | Matherson | 209/270 |
| 3,168,467 | 2/1965 | Dreyer | 210/138X |
| 3,363,759 | 1/1968 | Clarke-Pounder | 209/273 |
| 3,387,708 | 6/1968 | Salomon | 209/306X |
| 3,410,409 | 11/1968 | Rittenhouse | 209/273X |

Primary Examiner—Frank W. Lutter
Assistant Examiner—Robert Halper
Attorney—John N. Williams ABSTRACT: A pressurized knot screen for removing knots from paper pulp featuring a large rejects outlet in the circular casing, in the embodiment extending the height of the circular screen member, operable at a high, controlled reject rate. Advantageously, the width of the screening compartment downstream of the rejects outlet remains substantial for recirculation of knots that do not enter the rejects outlet. A screen cleaning device, in the embodiment a foil closely adjacent the accepts side of a stationary cylindrical screen plate, cleans away knots that impede flow. Also, a knotter in which the screen cleaning device is operated intermittently by a control device.

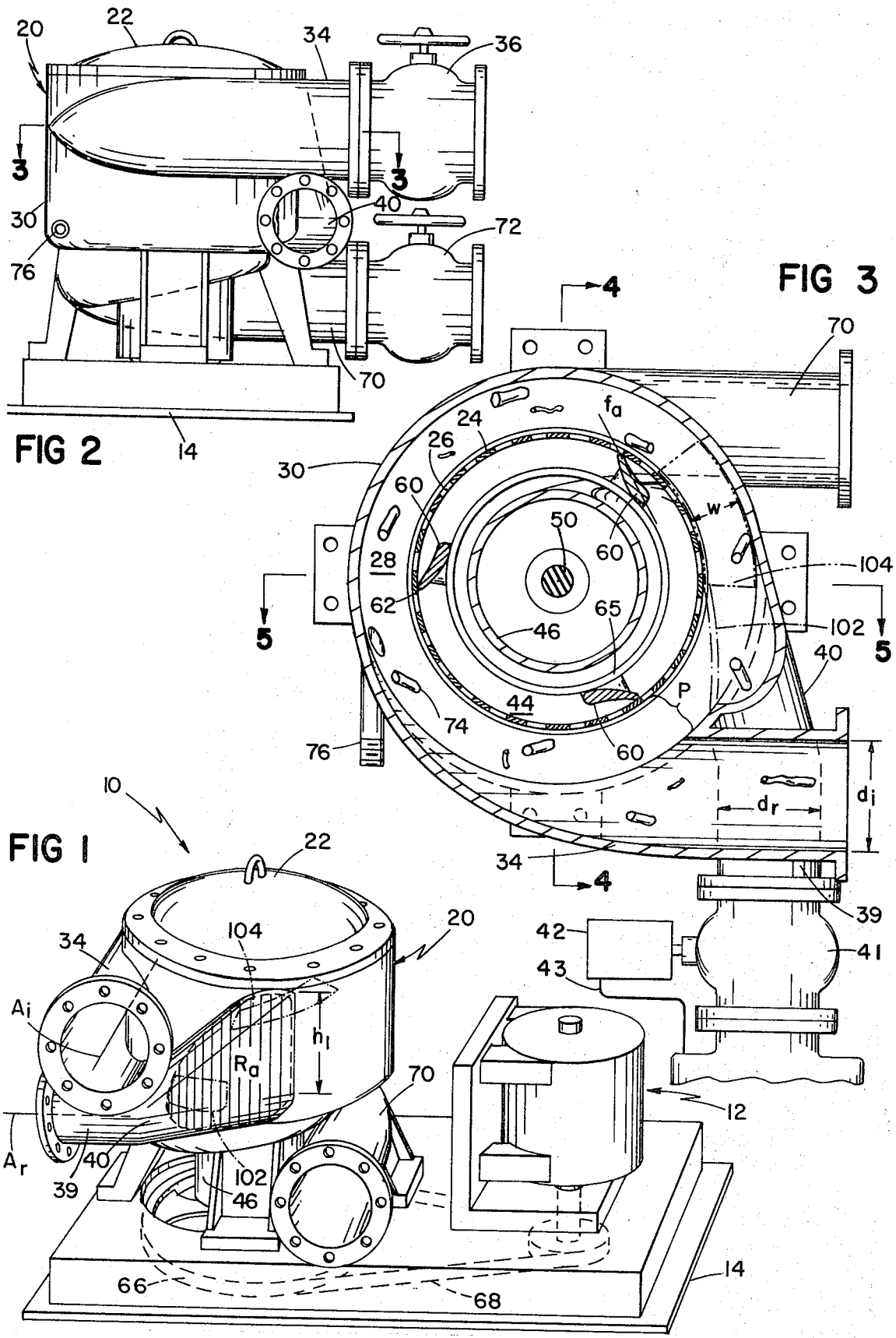

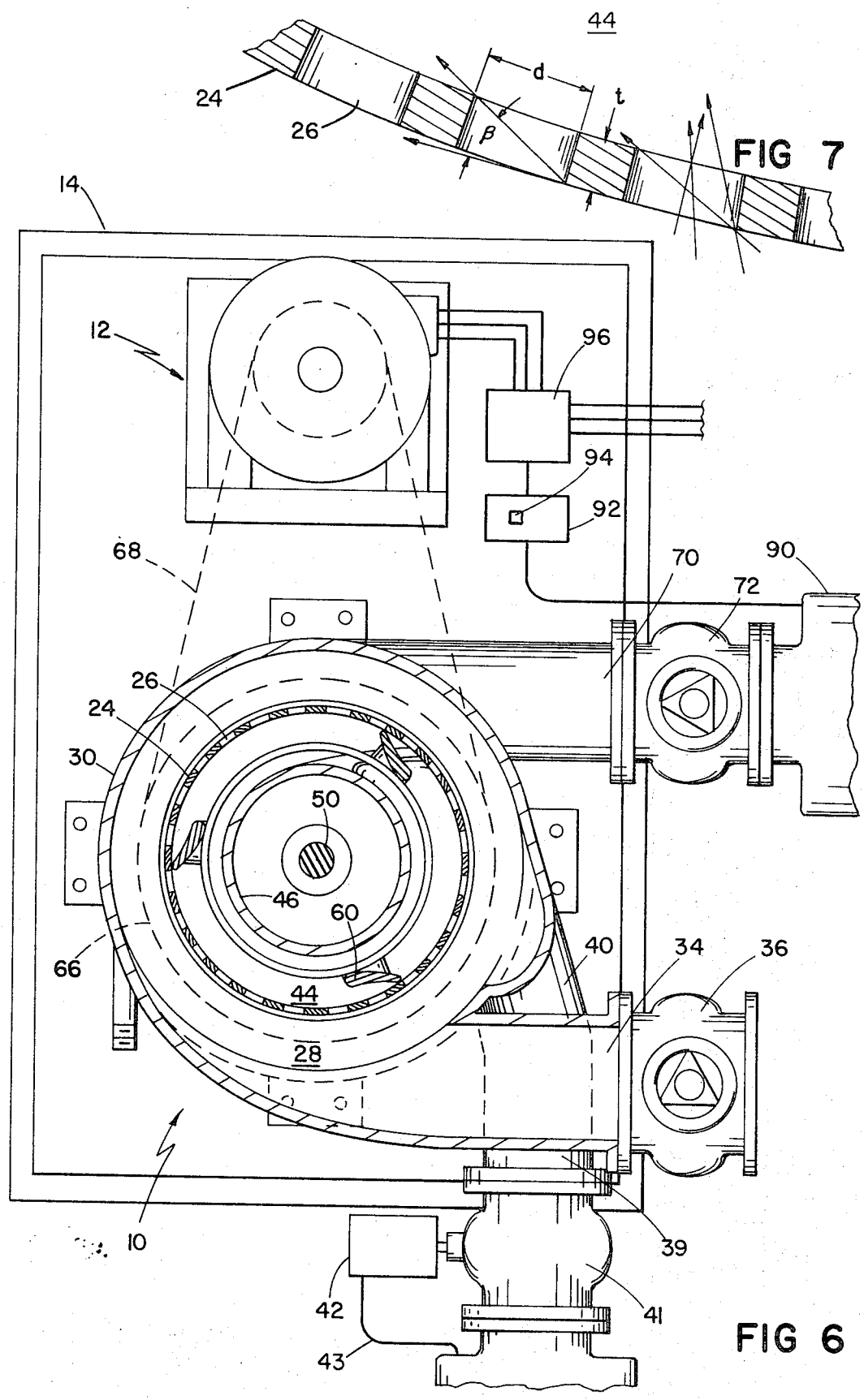

SCREENING APPARATUS

This invention relates to the removal of knots from paper pulp in a screening apparatus.

It is a primary object of the invention to successfully screen knots (defined as undefibered chips or other pieces of wood including hard knots in the usual sense) with dimensions ranging from ⅛ to 5 inches and larger from paper pulp of consistencies as great as 4 percent or higher, at high capacity and under substantial pressure, without plugging of either the screen member, screening compartment, or the various conduits. Other objects are to accomplish such screening with low power requirements and with high capacity per unit of screening area.

The invention concerns screening apparatus having a stationary, hollow, circular cross-sectional screen member and a device movable across the surface of the screen member for maintaining the screen member clean, the screen openings being sized to pass good fibers and to reject knots. A rounded pressure casing surrounds the screen member in a substantially spaced apart manner to define a screening compartment, a tangentially arranged conduit introduces under substantial pressure paper pulp containing the knots, and an accepts passage discharges screened pulp under pressure from within the screen member. According to the invention a rejects outlet is provided in the casing discharging to a conduit this rejects outlet being located substantially downstream from the inlet and extending substantially the full height of the screen member so that it may intercept and discharge, under pressure, knots along with a substantial quantity of pulp.

The invention further features the portion of the casing immediately downstream of the rejects outlet and preceding the inlet being substantially spaced from the screen member to define a substantial screening compartment path for the pulp and knots which do not enter the rejects outlet, to enable the knots to recirculate, a feature which is especially important when a flow control means is provided in the rejects conduit to control the rejects flow.

This invention further features a pressurized knot screen having a screen cleaning device which is operated by a control means in the manner that the screen cleaning device operates intermittently with substantial periods of stoppage and attendant savings of power. This feature results from the realization that conditions within a knot screen are essentially different from conditions occurring in fine screens. With fine screens the fibers quickly form a mat and cause stoppage of flow if the screen cleaning device is stopped. But in the case of a knot screen the fibers pass through the screen member and stoppage of the screen cleaning device results only in progressive blockage or plugging of individual holes by the knots themselves. Because the capacity of a screen is usually greater than the actual flow conditions through the screen member, it becomes possible to operate the screen successfully for a substantial period without operation of the screen cleaning device. The control means, which preferably responds to fluid conditions within the screen, can energize the screen cleaning device when a substantial number of holes are blocked, to remove the knots at that time.

In preferred embodiments, there are featured means for controlling the high reject rate including automatic regulation; a rejects outlet located immediately upstream of the inlet; a rejects outlet conduit nestled beneath the inlet conduit, a screen cleaning means movable across the face of the screen member to remove or wear away knots that are blocking or plugging holes in the screen member, screen holes of diameter from ¼ to 1 inch; a screen open area of at least 30 percent; a rejects outlet conduit flow area equal to a substantial fraction of the inlet conduit flow area and having a diameter at least half that of the accepts conduit; a screening compartment radial dimension of at least 4 inches; and a vertical cross-sectional area of the screening compartment which is of the same order as the inlet conduit flow area.

Other objects, features and advantages will appear from the following description of a prefered embodiment of the invention, taken together with the attached drawings thereof, in which:

FIG. 1 is a perspective view of the exterior of a preferred embodiment of the invention;

FIG. 2 is a side view of the preferred embodiment, including valves at the inlet conduit and accepts outlet conduit;

FIG. 3 is a horizontal cross-sectional view of the preferred embodiment along the line 3–3 of FIG. 2, including a valve at the rejects outlet conduit;

Figure 4:
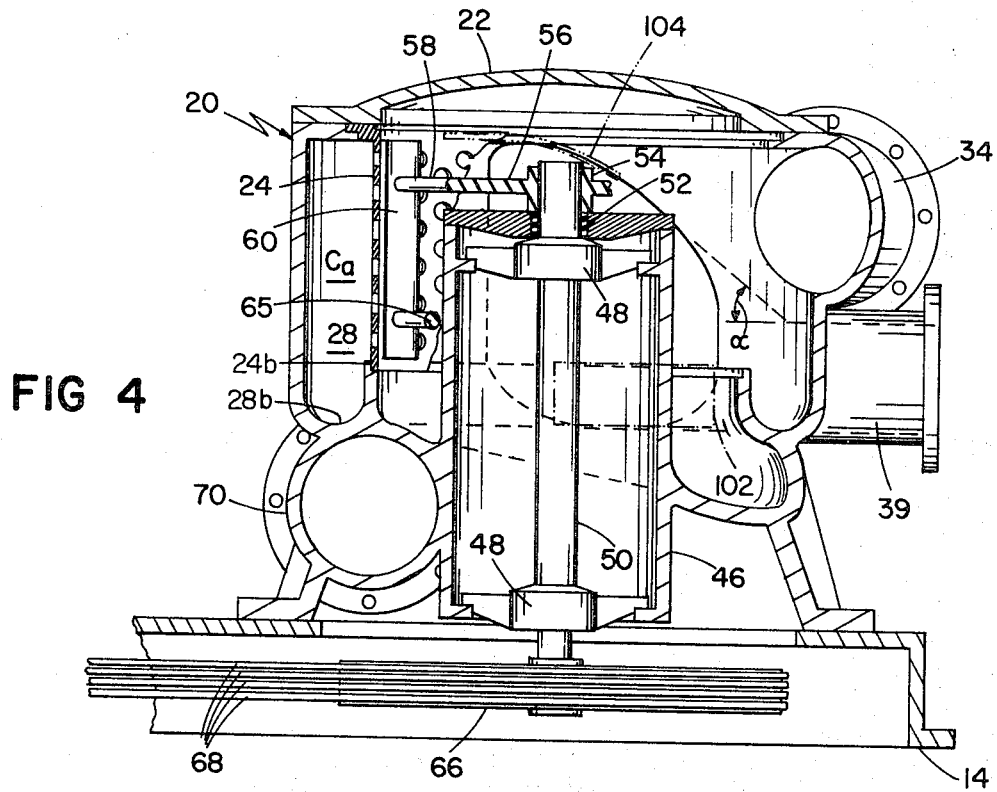
FIG. 4 is a vertical cross-sectional view of the preferred embodiment along the line 4–4 of FIG. 3.

FIG. 6 is a horizontal cross-sectional view of the preferred embodiment of the invention, including control means for the screen cleaning device; and FIG. 7 is a sectional view of a portion of the screen of the preferred embodiment, showing paths of pulp movement through the screen The drawings show a pressure knot screen mechanism (indicated generally at 10) and a motor assembly (indicated generally at 12), both mounted on a base 14.

The pressure knot screen 10 includes a vertically arranged cylindrical pressure casing 20 capable of withstanding operating pressures up to 50 p.s.i., including a removable pressure dome 22. The vertical dimension of the casing 20 is about 20 inches and its diameter is about 36 inches. Inside the pressure casing 20 is a vertically arranged screen member 24, of a thickness, $t$, of about ¼ inch, substantially smaller in diameter than the casing, and defining therewith an annular screening compartment 28.

The screen 24 has about 47 percent open area, with the openings sized to pass good fibers and reject knots. In the embodiment the openings comprise round holes 26, of a diameter, $d$, of ½ inch, equally spaced from each other. The screen member 24 has a vertical dimension, or height, $h$, of about 19½ inches and a diameter of about 24 inches. The top of the screen member 24 is in substantial horizontal alignment with the top of the vertical wall 30 of the casing 20.

In this embodiment the annular screening compartment 28 has a substantially uniform radial dimension, or width, $w$, of about 5½ inches. The bottom portion of the screening compartment 28 is a gutter formed by an imperforate wall 32 extending downward from the screen member 24, then changing slope uniformly to become the wall 30 of the casing 20.

An inlet conduit 34 comprises a pipe having a diameter, $d_i$, of 12 inches tangentially connected to the upper part of the casing 20. The portion of the casing 20 at the intersection with the conduit 34 is open in order to provide an inlet for the introduction of paper pulp under substantial pressure to the screening compartment 28. The cross-sectional flow area of the inlet conduit 34 is substantially equal to the vertical cross-sectional area of the screening compartment 28, $C_a$ (see FIG. 4). The inlet conduit 34 is provided with a valve 36 to regulate the flow of pulp through the conduit.

Figure 5:
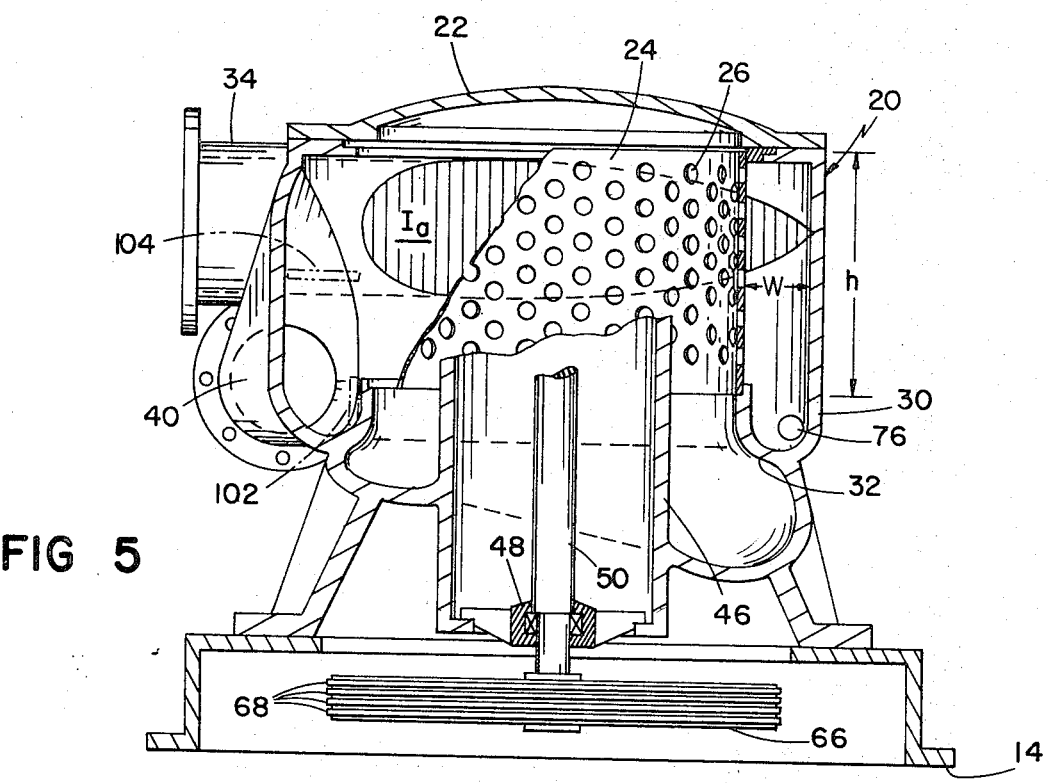
FIG. 5 is a vertical cross-sectional view of the preferred embodiment along the line 5–5 of FIG. 3, with parts broken away.

A rejects outlet conduit 40 includes a pipe 39 of diameter, $d_r$, of 8 inches, which is nestled (i.e. crossed with another member in a closely adjacent relationship, one above the other) below the inlet conduit 34, preferably so that the axis of the inlet conduit, shown as $A_i$, is perpendicular to the axis, shown as $A_r$, of the pipe 39 forming this part of the rejects outlet conduit 40. From a point just below the portion of the inlet conduit 34 closest to the casing 20, however, the rejects outlet conduit 40 is slightly bent toward the casing 20, the bottom wall of the conduit 40 remains at the same vertical height as the bottom of the preceding pipe 39 but the upper wall of the conduit 40 increases its height uniformly until the intersection of the conduit 40 and the casing wall 30 (the angle, $\alpha$, between the sloped upper wall of conduit 40 and the horizontal being about 45°). The intersection defines the opening $R_a$ (see vertical cross-hatching in FIG. 1), that provides a rejects outlet of height, $h_t$, of about 17 inches, extending substantially the height of the screening compartment 28. This rejects outlet, $R_a$, is adjacent the inlet, $I_a$ (see vertical cross-hatching in FIG. 5), on the upstream side.

In preferred embodiments, to achieve high reject rate, the diameter of a rejects outlet conduit of a screen should be at least about one half of the diameter of the accepts conduit and even of the inlet conduit. In the preferred embodiment of the drawings, the ratio of rejects outlet pipe area to inlet pipe area is 64:144 and the ratio of the intersection areas $R_a$ to $I_a$ is approximately 1:2. The rejects outlet conduit 40 is provided with a valve 41 to regulate the flow of rejects through the conduit; this valve is advantageously provided with an adjustable controller 42 and flow sensing line 43 (e.g. connected to a magnetic flow meter) permitting the maintenance of a desired minimum flow.

Inside the screen member 24 is the accepts compartment 44. Extending from within the accepts compartment 44 through the casing 20 is a shaft housing 46 supporting, by means of upper and lower bearings 48, a shaft 50. A portion of this shaft 50 extends upwardly through the shaft housing 46 into the accepts compartment 44. (The inside of the shaft housing 46 is protected from the contents of the accepts compartment 44 by a seal 52.) Mounted on this upward extension of the shaft 50 is a hub 54 supporting three outwardly extending arms 56 which in turn support horizontal upper support ring 58. Supported by this ring 58 are three vertically arranged hydrofoils 60 on the accepts side of the screen member 24 extending the length of the screen member 24. In cross section the foils 60 are slightly concave on the screen member side with a long dimension of about 4 inches and a perpendicular dimension varying from about 1 inch at one end to about ½ inch at the other. The edges of each of the foils 60 are all slightly rounded. The axis, $f a$, of each of the foils 60 is disposed at an angle to the circumferential path of travel with the thinner edge 62 trailing and closer to the screen member 24. A lower ring 65 connects the lower portions of the foils 60.

The other end of the shaft 50 extends downwardly through a hole in the base 14 where it is connected to a drive sheave 66 mechanically linked by drive belts 68 to the motor assembly 12.

Referring to the arrangement of FIG. 6, a magnetic flow meter 90 (such as is manufactured by the Foxboro Company of Foxboro, Massachusetts) is located in the accepts conduit. The meter 90 is connected to a recording chart 92 which includes a switch 94 linked to the recorder pen (e.g. a Dynalog Recorder and Rotac switch, both also manufactured by the Foxboro Company). The switch 94 is connected to a controller 96 for the motor assembly 12, for a purpose to be discussed later herein.

The bottom of the accepts compartment 44 is an annular gutter that uniformly increases its width and depth until it becomes an accepts outlet conduit 70 of 10 inch diameter pipe. The accepts outlet conduit 70 is provided with a valve 72 to regulate the flow of accepts through the conduit.

As indicated in dotted lines in FIG. 3 a cutwater device 102 extending from the bottom 28b of screening compartment 28 (FIG. 4) to the bottom 24b of the screen member 24 can be provided to force all matter in the gutter to enter the rejects outlet. Also a deflector 104, indicated in dotted lines in FIG. 1 as extending radially from the casing wall to the screen member, and sloping downwardly, helically toward the gutter, may be employed.

In operation, paper pulp or stock of consistency as great as 4 percent or higher may be introduced at substantial pressure (e.g. 20 and even 50 p.s.i.) and high flow rate (e.g. 3500 gallons per minute) into the screening compartment 28 by way of the inlet conduit 34. The accepted fibers pass through the screen member 24 which remains stationary with respect to the casing 20 into the accepts compartment 44 and then through the accepts outlet conduit 70 while still under substantial pressure. Particular advantages of a pressurized apparatus are that the apparatus may be located in a mill at points where the pulp to be processed is already under substantial pressure (avoiding the necessity of positioning the apparatus at an elevated position) and that a closed, pressurized system reduces the introduction of air, thereby reducing foam in the liquors used in mills.

The crucial problem in such a screening process is to prevent the knots from plugging the screen member 24, and to effect their removal. With screening apparatus as shown a more or less balanced condition for the knots 74 in the screening compartment 28 may exist, the knots on one hand being subjected to moderate centrifugal forces tending to urge the knots outwardly against the casing 20, while on the other hand the knots are subjected to the influences according to Stokes law, tending to go in the same direction as the flow, which is predominantly inward. The knots 74 would therefore follow a somewhat random movement radially, while circulating around the screening compartment 28, due to the relatively balanced conditions in the compartment. The knots, however, would be prevented by the screen member 24 from continuing with the main inward flow through the screen member 24, while the rejects outlet, $R_a$, would intercept those knots which go in the direction of outer casing 20, this removal being assisted by a high secondary flow of pulp through the rejects outlet, varying from 20 percent to 50 percent of the inlet flow.

With the maintenance of an open path, P, in the screening compartment 28 beyond the rejects outlet, $R_a$, the free movement of the knots may be enhanced or preserved to aid in their removal as well as to give an opportunity for the entire area of the screen member 24 to perform its screening function.

In some instances, e.g. where a very high reject rate is desired, a deflector plate (not shown) located in the screening compartment 28 downstream of the rejects outlet $R_a$ prevents a substantial amount, or even all of the recirculation of pulp and knots.

For those knots which tend to remain at the screen member 24, the rotating screen cleaning foils 60 urge the knots away from the screen member to resume their random and circular motions, and break up or "wear away" knots which protrude through the holes 26.

The magnetic flow meter 90 measures the flow of pulp through the screen member 24. The flow is recorded on the chart of the recorder 92. The switch 94 attached to the pen of the recorder 92 turns the motor controller 96 on when the flow through the screen member 24 falls to a predetermined level. When the flow returns to a higher level the motor may be turned off, generally so that it is off for more time than it is on. Advantageously, the switch will transfer control of the motor to a second, timing switch (not shown) in the controller 96 which will continue to operate the screen cleaning foils 60 for a few minutes. This ensures good cleaning of the screen member 24 and avoids the necessity of starting the motor driving the screen cleaning foils 60 too often in a short time. This procedure is the result of the realization that the conditions within a knot screen (e.g. a screen having hole size of at least ¼ inch inches minimum dimension) are different from those occurring in fine screens in that the screen member does not form a thick mat of fibers upon stoppage of the screen cleaning device because there is no bridging (fiber extending across hole) due to the large minimum dimension of ¼ inch and no stapling (fiber extending across land with ends trailing in adjacent holes) due to the large minimum distance of ¼ inch between the closest parts of adjacent holes. The flow change detector means determines when a substantial number of holes are plugged, and a screen cleaning device is operated to remove the knots at that time. (By operating the foils or screen cleaning device for less than half the time under such control, a substantial amount of power may be saved.)

The heavier debris (i.e. metal debris) is urged to the outside wall soon after entering through the inlet, $I_a$, hence the screen member 24 is protected from damage by that debris, and the debris is effectively removed through the rejects outlet conduit 40. The heaviest debris may fall to the gutter of the screening compartment 28 and move slowly out the rejects outlet conduit 40. Dilution fluid may be introduced into the gutter by way of an inlet 76 to aid the movement of heavy rejected material into the conduit.

The automatic regulation of the valve 41 at the rejects outlet conduit 40 by adjustable controller 42, shown only in block form in FIG. 3, the operation of which may be based upon changes in pressure or other criteria, will permit the maintenance of the reject flow needed for successful successful operation.

In general a knot screen may be defined as having screen openings of minimum dimension of ¼ inch. To obtain the full advantage of the present invention the screen member should however have at least 30 percent and preferably between 40 and 50 percent open area to maximize capacity and the openings, if they are round holes in a screen plate, should fall within the range of ¼ to 1 inch, with lands of at least ¼ inch between holes.

Advantageously, stationary screen members should be employed with the inlet flow introduced in a manner that the flow does not impinge with full force directly upon the screen member. Preferably, with the inward flow arrangement, the inlet is tangential, to remove metal debris by centrifugal action, and perhaps more importantly, to produce a counter to the Stokes effect upon the knots, to prevent them from impeding flow through the screen member, as mentioned above.

In the embodiment the diameter, $d$, of the holes 26 and thickness, $t$, of the screen member 24 in relation to the diameter of the screen member allow pulp moving in a direction at only a slight angle, B, from the tangential direction to pass freely into the accepts compartment 44 (see FIG. 7). Other directions of pulp flow that allow pulp to flow easily into the accepts compartment 44 are also shown.

Also, advantageously, the screen cleaning device is operable across the accept side of the screen plate, and positioned with very little clearance from the screen plate, e.g., .020 to .050 inch, located to wear away or break up, and thereby remove, knots which protrude through the screen openings.

While very high reject flows may be advantageous in some mills (they can be obtained with the aid of a deflector plate described above), in other mills, while maintaining a high reject rate in accordance with the invention i.e. a reject rate of at least 20 percent of the inlet pulp by weight, it is advantageous nevertheless to limit that rate as much as possible to concentrate the knot content of the rejects flow. The automatic valve 41 serves this function. It may plug quite often, at which times the flow detection means 43 will momentarily open the valve and relieve the clogged condition. Advantageously the recirculation flow path P provides a means for knots to accumulate in the screening compartment during this momentarily plugged condition, allowing the screen to continue its operation. For this effect the radial dimension of path P, and the entire screening compartment in the embodiments of the drawings should be at least 4 inches.

A conical casing surrounding a conical screen member may be substituted for the cylindrical system described above, with corresponding changes of the other elements.

Other embodiments will occur to those skilled in the art and are within the following claims.

I claim:

1. A pressurized knot screening apparatus comprising a stationary hollow screen member, said screen member having holes with diameters in the range of ¼ inch to 1 inch and at least 30 percent open area, a screen cleaning device movable across the face of said screen member on the accept side and adapted to remove or wear away knots plugging said holes in said screen member, a rounded pressure casing surrounding said screen member in a substantially spaced apart manner to define a screening compartment, said screening compartment having a substantially uniform radial dimension of at least 4 inches, an inlet in said casing with a tangentially arranged conduit constructed and arranged to introduce under substantial pressure fluid paper pulp containing knots of substantial size, a rejects outlet in said casing with a tangentially arranged conduit, said rejects conduit including flow control means said rejects outlet being located on the outer wall of said screening compartment, with at least a portion of said outlet spaced from the ends of said casing in a position opposite the screen member so as to intercept and continuously discharge under substantial pressure a portion of the circulating knots together with a quantity of stock, said rejects outlet in said casing being located immediately preceding said inlet, and an accepts conduit constructed and arranged to discharge screened stock under pressure from within said screen member, the rejects outlet conduit and flow control means adapted to enable a reject rate of at least 20 percent of the inlet pulp by weight.

2. A pressurized knot screening apparatus comprising a stationary hollow screen member, said screen member having holes with diameters in the range of ¼ inch to 1 inch, a screen cleaning device movable across the face of said screen member on the accept side and adapted to remove or wear away knots plugging said holes in said screen member, a pressure casing having ends and having an outer wall surrounding said screen member in a substantially spaced apart manner to define a screening compartment, said screening compartment having a radial dimension of at least 4 inches throughout its extent, an inlet in said casing with a tangentially arranged conduit constructed and arranged to introduce under substantial pressure fluid paper pulp containing knots of substantial size, a rejects outlet in said casing with a tangentially arranged conduit, said rejects outlet being located on the outer wall of said screening compartment, with at least a portion of said outlet spaced from the ends of said casing in a position opposite the screen member so as to intercept and continuously discharge under substantial pressure a portion of the circulating knots together with a quantity of stock, said rejects outlet in said casing being located substantially downstream of and preceding said inlet, and an accepts conduit constructed and arranged to discharge screened stock under pressure from within said screen member.

3. The pressurized knot screening apparatus of claim 2 wherein the opening in the casing for said rejects outlet extends in the direction between the ends of the casing substantially the full length of said screen member and said outlet opening is constructed throughout said length to intercept and continuously discharge circulating knots along with a quantity of stock.

4. A pressurized knot screening apparatus as claimed in claim 3 including rejects flow control means and including condition responsive means associated with the rejects flow, adapted automatically to open further said rejects conduit flow control means when the rejects flow becomes reduced.

5. A pressurized knot screening apparatus as claimed in claim 3 in which the diameter of said rejects outlet conduit is at least one half that of said accepts conduit.

6. A pressurized knot screening apparatus as claimed in claim 3 in which the flow area of said inlet conduit is of the same order as a vertical cross-sectional area of said screening compartment at any point.

7. A pressurized knot screening apparatus as claimed in claim 3 in which said rejects outlet in said casing is located immediately preceding said inlet and in which said rejects outlet conduit and said inlet conduit are nestled, one of said conduits being above the other and the axes lying in planes which intersect.

8. A pressurized knot screening apparatus as claimed in claim 7 in which said rejects outlet conduit is located below said inlet conduit.